United States Patent
Lipinski et al.

(12)

(10) Patent No.: US 6,361,666 B1
(45) Date of Patent: Mar. 26, 2002

(54) GAS DIFFUSION ELECTRON, PROCESS FOR PRODUCING AN ELECTRODE AN CARBONIZABLE COMPOSITE

(75) Inventors: Matthias Lipinski, Wappingers Falls, NY (US); Rainer Leuschner, Grossenseebach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/575,006

(22) Filed: May 19, 2000

Related U.S. Application Data

(63) Continuation of application No. PCT/DE98/03251, filed on Nov. 6, 1998.

(30) Foreign Application Priority Data

Nov. 19, 1997 (DE) .......................... 197 51 296

(51) Int. Cl.$^7$ .............................. C25B 11/00
(52) U.S. Cl. .................... 204/283; 429/42; 429/44; 502/101; 502/416; 502/418; 502/426; 428/304.4; 428/310.5; 428/311.1; 428/311.7; 428/320.2; 428/477.4
(58) Field of Search ................ 204/283, 296; 429/44, 42; 502/101, 416, 418, 426; 428/304.4, 310.5, 311.1, 311.7, 320.2, 477.4

(56) References Cited

U.S. PATENT DOCUMENTS

| 5,260,855 A | 11/1993 | Kaschmitter et al. ....... 361/502 |
| 5,372,981 A | 12/1994 | Witherspoon ................ 502/155 |
| 5,429,886 A | * 7/1995 | Struthers ..................... 429/44 |

OTHER PUBLICATIONS

"RGS—Polymere, Polymere Räumlich Globularer Struktur", dated 1995, Uni Leipzig, pp. 1–5, pertains to polymer of spacial globule structure; No month available.

"Der Einsatz von Sorbentien räumlich globularer Struktur zur Abtrennung radioaktiver Verunreinigungen aus Wasser", (Gorski et al.), dated 1993, Grodon and Breach Science Publishers, vol. 29, pp. 275–282, No month available.

* cited by examiner

*Primary Examiner*—Bruce F. Bell
(74) *Attorney, Agent, or Firm*—Herbert L. Lerner; Laurence A. Greenberg; Werner H. Stemer

(57) ABSTRACT

A gas diffusion electrode made of carbon, a process for producing an electrode and a carbonizable composite are provided. Thin, flat, porous gas diffusion electrodes made of carbon, which have a smooth surface and in which the porosity can be regulated at will, are obtained by pyrolysis of a composite of an organic polymer having a spatial globular structure (SGS polymer) and a reinforcing skeleton formed at least in part of organic material.

31 Claims, No Drawings

GAS DIFFUSION ELECTRON, PROCESS FOR PRODUCING AN ELECTRODE AN CARBONIZABLE COMPOSITE

CROSS-REFERENCE TO RELATED APPLICATION

This application is a continuation of copending International Application No. PCT/DE98/03251, filed Nov. 6, 1998, which designated the United States.

BACKGROUND OF THE INVENTION

1. Field of the Invention

The invention relates to a gas diffusion electrode made of carbon, a process for producing an electrode and carbonizable composite.

Gas diffusion electrodes are used, in particular, in batteries and especially in fuel cells such as PEM fuel cells (PEM=polymer electrolyte membrane). In fuel cells, for example, the energy stored in chemical form in the hydrogen and oxygen, which would be released in an explosive hydrogen-oxygen recombination reaction, can be converted into electric energy by means of an electrochemical process which represents a reversal of water electrolysis. PEM fuel cells have a central membrane/electrode unit which includes a sheet-like, proton-conducting solid state electrolyte on each side of which there is arranged a very smooth hydrophobic, porous gas diffusion electrode provided with a catalyst coating. Oxygen is supplied to the electrode on the cathode side and hydrogen is supplied to the electrode on the anode side. Electron exchange takes place on the catalyst-coated surfaces of the electrodes, resulting in an electric potential being built up. On the cathode side, water is formed as reaction product of the electrochemical process.

The electrodes have to meet the following requirements:

Good electrical conductivity, good gas permeability and mechanical stability; in addition, they should have a smooth outer surface. A smooth surface is very important because this achieves the best possible contact, and thus a low electrical contact resistance, between electrode, catalyst and electrolyte. The electrodes should therefore have at most a surface roughness in the micron range. In order to make sufficient gas flow possible, the nitrogen permeability of the electrodes should be $>10^{-6}$ m$^2$/s at atmospheric pressure, preferably $>10^{-5}$ m$^2$/s. For this reason, the largest pores should have a diameter of $\geq 100$ nm, preferably from 0.5 to 10 $\mu$m. It is also important for the electrodes to have a hydrophobic character. This is because it prevents the water formed in the electrochemical reaction between hydrogen and oxygen from accumulating in the pores and blocking them.

To meet the above-mentioned requirements, gas diffusion electrodes are produced using modified carbon papers, i.e. carbon papers which are sealed on the surface by means of carbon black or graphite. However, these materials are not satisfactory in respect of surface smoothness and pore size.

U.S. Pat. No. 5,260,855 discloses the use of electrodes made of foam-type carbon in high-capacity capacitors ("supercapacitors"); the foam-type carbon can be an aerogel or xerogel. Such electrodes, too, do not meet the abovementioned requirements. This is because a carbon matrix is integrated into the aerogel to increase the electrical conductivity. For this purpose, the carbon matrix, for example in the form of carbon fibers, is incorporated into the gel before gelation and pyrolysis. Since aerogel and carbon matrix display different shrinkage behavior during pyrolysis, microcracks are formed. The pyrolyzed aerogel thus loses some of its adhesion to the surface of the carbon matrix. The pore size of the electrodes, which is determined by the matrix material, can therefore not be set and reproduced exactly. In addition, the surface of the electrodes is severely roughened during pyrolysis.

SUMMARY OF THE INVENTION

It is accordingly an object of the invention to provide a gas diffusion electrode made of carbon, a process for producing an electrode and a carbonizable composite, which overcome the above-mentioned disadvantages of the prior art devices and methods of this general type, in which the electrode is made of carbon having a smooth surface, in which the porosity can be regulated at will and in which no problems occur as a result of cracks between the electrode material and a supporting skeleton.

With the foregoing and other objects in view, there is provided, according to the invention, a thin, flat, and porous carbon gas diffusion electrode, comprising a side in contact with a supply of gas and a side in contact with an electrolyte, and a pyrolysis product of a composite of an organic polymer having a spatial globular structure (SGS polymer) and a reinforcing skeleton formed at least in part of organic material. The porosity of the carbon gas diffusion electrode according to the invention can be regulated at will while the surface of the electrode is smooth.

With the foregoing and other objects in view, there is also provided, according to the invention, a method of producing a thin, flat, and porous carbon gas diffusion electrode, which comprises the steps of providing a composite of an organic polymer having a spatial globular structure (SGS polymer) and a reinforcing skeleton formed at least in part of organic material, and pyrolyzing the composite under protective gas.

With the foregoing and other objects in view, there is further provided, according to the invention, a novel carbonizable composite affording a porous carbon gas diffusion electrode upon pyrolysis, the composite comprising an organic polymer having a spatial globular structure (SGS polymer) and a reinforcing skeleton formed at least in part of organic material, the SGS polymer and the reinforcing skeleton having comparable volumetric shrinkage upon pyrolysis.

The gas diffusion electrode of the invention, which is porous and has an extremely smooth surface, can be flat and thin, since it has been found that the porous, thin, flat characteristics of the reinforcing skeletons are largely preserved during pyrolysis according to this invention. For applications in the field of fuel cells, the gas diffusion electrode also has to be hydrophobic. In order to achieve this, it is additionally hydrophobicized during or after pyrolysis.

Polymers of spatial globular structure (SGS polymers) are known per se (see: "Isotopenpraxis, Environ. Health Stud."), Vol. 29 (1993), pages 275 to 282, and also http://rzaix340.rz.uni-leipzig.de/kind/rgseng.htm, last update: Aug. 15, 1996). SGS polymers have a high porosity because of the globular structure and are used, for example, as filter materials. The size of the globules, and thus the porosity, of SGS polymers can be regulated easily, such that typical SGS polymers permit the passage of 800–3000 specific volumes per hour. The particle size of typical SGS polymers can range from 0.3 to 15 $\mu$m, with pores ranging from 0.01 to 50$\mu$m whose size can be controlled to within plus or minus 10%, thus affording a porosity in the range from 35 to 90%.

Since it has been found that the high porosity is retained even after pyrolysis, SGS polymers in pyrolyzed form are particularly suitable for porous gas diffusion electrodes according to the invention.

The reinforcing skeleton, which serves to stabilize the SGS polymer, is formed at least partly of organic material. This generally means that at least 80% of the reinforcing skeleton is organic material. Inorganic constituents can be, for example, glass fibers or flame retardants such as boron-containing salts. The organic material of the reinforcing skeleton has a volume shrinkage during pyrolysis which is comparable to that of the SGS polymer and the skeleton after pyrolysis is still sufficiently strong for it to be able to support the pyrolyzed SGS polymer.

It is advantageous for the reinforcing skeleton to be readily wettable by the SGS polymer. For this purpose, the organic material preferably has substructures which can form hydrogen bonds. These substructures are, in particular, functional groups such as OH, OR, CO, COOH, COOR, CN, NH$_2$, NHR, NR$_2$, CONH$_2$, CONHR, CONR$_2$, CO—NH—CO and CO—NR—CO. Hydroxyl and carboxamide groups have been found to be particularly advantageous.

The gas diffusion electrode of the invention displays significant improvements compared to known electrodes. This can be attributed to the use of a reinforcing skeleton of organic material which together with the SGS polymer forms, depending on the type and porosity (of the reinforcing skeleton), a different structure compared to the non-reinforced SGS polymer during production of the electrode.

As organic material for the reinforcing skeleton, preference is given to cellulose, polyamides, in particular aromatic polyamides (aramides), polyester and viscose staple or loose fibers. However, for example, the following materials are also useful: polymethyl methacrylate, polyacrylonitrile, polyurea, poly-urethane, phenolic resins such as phenol-formaldehyde resins, and paper. The reinforcing skeleton itself can be in the form of porous membranes, e.g. porous filter material, or flexible fiber nonwovens and woven fibers.

The reinforcing skeleton can advantageously have a pore radius gradient. This can be achieved in a simple way by, for example, arranging organic membranes having different pore sizes next to one another and joining them together, for example by adhesive bonding. The pore radius gradient (in the electrodes), where the electrodes have a finer pore structure on the electrolyte side than on the gas supply side, improves the removal of water and consequently the performance of the fuel cell. In such a reinforcing skeleton, the more coarsely structured membrane also provides additionally mechanical stabilization of the SGS polymer and the fine-pored carbon layer formed therefrom. Pore size, surface smoothness and mechanical stability can thus be established in a simple and targeted manner via the reinforcing skeleton.

SGS polymers can be prepared from many starting compounds. In the gas diffusion electrode of the invention, particular preference is given to using condensation polymers based on a phenol and an aldehyde as reacting monomers, especially condensation polymers based on resorcinol and formaldehyde. However, besides resorcinol (1,3-dihydroxybenzene), it is also possible to use other phenolic compounds, for example phenol itself and the other dihydroxybenzenes, i.e. catechol and hydroquinone, and also trihydroxybenzenes such as pyrogallol and phloroglucinol, as well as bisphenol A. The phenolic ring can also bear further substituents, for example alkyl groups, substituted alkyl groups such as CH$_2$OH and carboxyl groups, i.e. it is possible to use, for example, compounds such as alkylphenols and dihydroxybenzoic acids.

In place of formaldehyde, it is also possible to use other aldehydes, for example furfural (α-furfuryl aldehyde). The aldehyde can also be partially or completely replaced by compounds which contain the aldehyde in prereacted form, namely crosslinkers. Examples of such compounds are 2,6-dihydroxymethyl-4-methylphenol, 1,3,5-triacetoxymethylbenzene, bis(4-methoxymethylphenyl) ether and hexamethoxymethylmelamine (HMMM). Further crosslinkers which can be used are compounds such as polyfunctional melamine ethers, melamine alcohols and melamine acetates and bifunctional or polyfunctional benzyl ethers, benzyl alcohols and benzyl esters and also benzaldehyde acetals. The only important thing is that the phenol and/or the aldehyde or crosslinker is polyfunctional so as to enable a three-dimensional network to be formed, and that the polymer has a proportion of aromatic moieties which is as high as possible in order to keep the shrinkage on pyrolysis as low as possible.

The SGS polymers generally have an H/C ratio of ≦1.5 and an (O+N)/C ratio of ≦0.6. Preferred pyrolyzable SGS polymers are, for example, the following phenol/formaldehyde condensation polymers:

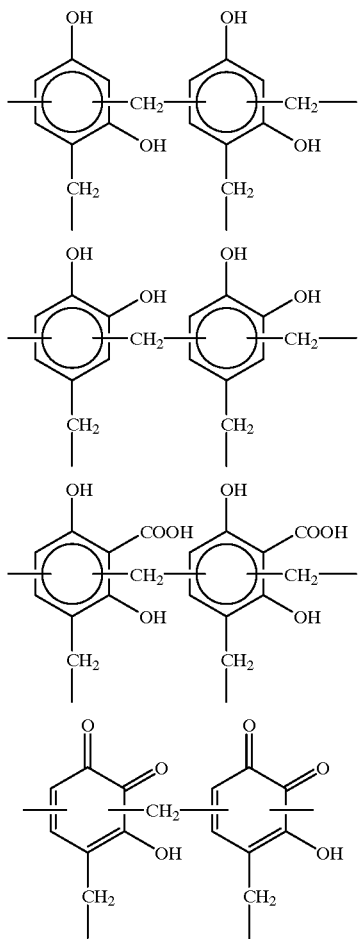

-continued

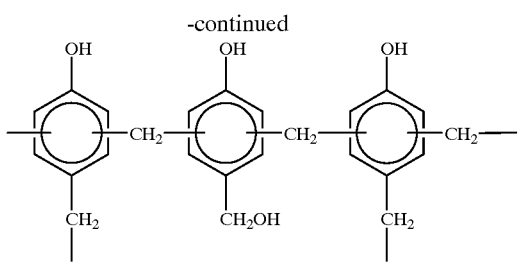

The gas diffusion electrode of the invention is advantageously produced by impregnating the reinforcing skeleton with an acid solution of monomers ("monomer solution") which can be converted into an SGS polymer, using quantities of reinforcing skeleton and monomer solution such that the proportions of SGS polymer and reinforcing skeleton in the resulting structure are in the range from 20:1 to 1:20 by weight, preferably in the range from 4:1 to 1:4 by weight. Polymerization and, if desired, aging are then carried out and the structure is subsequently dried and pyrolyzed under a protective gas. The protective gas can be an inert gas such as argon, a reducing gas such as hydrogen or methane, or a mixture of inert and reducing gases. If required, additional hydrophobicization is subsequently carried out.

During polymerization and during pyrolysis, an interaction between the monomer solution and the organic material of the reinforcing skeleton can occur. In the case of polar or hydrophilic organic materials (for the reinforcing skeleton), e.g. cellulose, having some reactive functional groups on the skeleton surface, attachment of globules of SGS polymer to the reinforcing skeleton surface occurs, so that the latter is very effectively coated. This leads finally to a very stable electrode structure, although the individual components do not have such properties.

Apart from the advantage that the reinforcing skeleton of organic material is readily wetted by the monomer solution, which makes its processing easier and has an advantageous effect on the structure and thus the properties, e.g. pore size, of the resulting SGS polymer, a further advantage of such a supporting skeleton shows up during pyrolysis: the organic material displays shrinkage properties comparable to those of the SGS polymer such that the volumetric shrinkage of the reinforcing skeleton and the SGS polymer are within plus or minus 10% of one another. As a result of this, distortion and cracks, i.e. detachment of the SGS polymer from the organic membrane or fiber material of the reinforcing skeleton, are avoided during pyrolysis. In contrast to inorganic supporting skeletons, there is, in this case, retention of an intimate bond between the pyrolyzed SGS polymer and the pyrolyzed reinforcing skeleton even after pyrolysis. This also leads to an additional improvement in the surface smoothness.

The production of thin, flat, porous, hydrophobic gas diffusion electrodes according to the invention is in principle carried out as follows.

The respective reinforcing skeleton is impregnated with a solution of monomers, preferably resorcinol and formaldehyde. As catalyst for the conversion to the SGS polymer, use is made of an acid, preferably oxalic acid. Since phenols themselves are slightly acidic and the reinforcing skeletons sometimes also have acid groups, the use of a catalyst can sometimes be omitted.

The impregnated reinforcing skeleton is placed on a planar substrate, preferably a glass plate, and then, using the sandwich principle, covered with a further glass plate so that the material cannot dry out during the polymerization. The material is left in this form for some time, with polymerization and, if appropriate, aging occurring. This is preferably achieved at a slowly rising temperature from room temperature to about 90° C.

Drying of the materials is carried out at atmospheric pressure, preferably at elevated temperature, in particular at from about 50 to 100° C., thus affording a carbonizable composite according to the invention.

The subsequent pyrolysis is preferably carried out at a temperature in the range from 600 to 2000° C. under protective gas, suitably an inert gas, in particular argon or nitrogen, or a reducing atmosphere, in particular hydrogen or methane, or under reduced pressure. In a particularly preferred feature, pyrolysis under 1–10% methane or other hydrocarbon gases in argon leads to a deposition of carbon, which improves the hydrophobic character of the resulting carbon electrode due to a closure of nanoporosity (pores less than 1 nm). During pyrolysis, the organic constituents of the SGS polymer and those of the reinforcing skeleton are converted into carbon. It is advantageous to load the specimens with sufficiently thermally stable, inert materials, preferably ceramics, in order to avoid warping. The matched shrinkage of the organic reinforcing skeleton results in thin, stabilized electrode materials having a surface smoothness which has not been achieved heretofore.

The hydrophobicization of the electrode materials produced in the above-described manner, which is necessary for the use of these materials in fuel cells, can be carried out by means of silylation (of the internal surface area). For this purpose, the electrodes are, for example, impregnated with a solution of trimethylchlorosilane or treated with gaseous trimethylchlorosilane. The hydrophobicization is advantageously carried out by means of a perfluorinated polymer. For this purpose, the electrodes are, for example, impregnated with a solution of a copolymer of perfluoro-2,2-dimethyldioxole and tetrafluoroethylene.

Other features which are considered as characteristic for the invention are set forth in the appended claims.

Although the invention is described herein as embodied in a gas diffusion electrode made of carbon, a process for producing an electrode and a carbonizable composite, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

EXAMPLE 1

15 g of a 40% strength formaldehyde solution are mixed with 10.99 g of resorcinol, followed by addition of 4.0 g of a 0.005 N oxalic acid solution and 4.0 g of water to this mixture. This solution is used to impregnate a coarse-pored viscose staple fiber filter (mean pore diameter: about 20 µm) which is then, using the sandwich principle, placed between two parallel planar glass plates and stored with exclusion of air in a closed container for about 24 hours at room temperature; under these conditions, the material polymerizes. The specimen is then left to age for about a further 24 hours at a temperature of about 50 to 90° C., and is subsequently taken from the container and dried at a temperature of about 90° C. The dried specimen is then carbonized by pyrolysis at about 1100° C. in a nitrogen atmosphere, being held at this temperature for about 1 hour. Subsequent hydrophobicization is carried out by impregnating the specimen with a 1% strength solution of a copolymer of perfluoro-2,2-dimethyldioxole and tetrafluoroethylene in perfluorodecane.

After allowing excess solution to drip off, the specimen is dried by heating it continuously to about 330° C. and holding it at this temperature for about 15 minutes.

Such a procedure gives a hydrophobic, mechanically stable gas diffusion electrode having a pore diameter of about 10 μm. The surface roughness of the electrode is of the same order of magnitude.

EXAMPLE 2

45 g of a 40% strength formaldehyde solution are mixed with 33 g of catechol, followed by addition of 22 g of a 0.01 N oxalic acid solution. A coarse-pored polyester nonwoven (mean pore diameter: about 50 μm) is impregnated with this solution and is subsequently sprayed again with the solution. The nonwoven is then, using the sandwich principle, placed between two parallel planar glass plates and stored with exclusion of air in a closed container at about 50° C. for about 24 hours; under these conditions, the material polymerizes. The specimen is subsequently rinsed with acetone and dried at a temperature of 90° C. for about 24 hours. The dried specimen is then pyrolyzed at about 1100° C. in a nitrogen atmosphere, being held at this temperature for about 1 hour. Subsequent hydrophobicization is carried out in the same way as in Example 1.

Such a procedure gives a hydrophobic, mechanically stable gas diffusion electrode having a pore diameter of about 5 μm. The surface roughness of the electrode is of the same order of magnitude.

EXAMPLE 3

45 g of a 40% strength formaldehyde solution are mixed with 33 g of resorcinol, followed by addition of 22 g of a 0.012 N oxalic acid solution. A coarse-pored polymethyl methacrylate nonwoven (mean pore diameter: about 40 μm) is impregnated with this solution and is subsequently sprayed again with the solution. The nonwoven is then, using the sandwich principle, placed between two parallel planar glass plates and stored with exclusion of air in a closed container at about 65° C. for about 24 hours; under these conditions, the material polymerizes. The specimen is subsequently dried at a temperature of 90° C. for about 24 hours. The dried specimen is then pyrolyzed at about 1100° C. in a nitrogen atmosphere, being held at this temperature for about 1 hour. Subsequent hydrophobicization is carried out by firstly exposing the specimen to a saturated water vapor atmosphere for about 24 hours at about 90° C. This procedure is repeated in a saturated trimethylchlorosilane atmosphere and the specimen is then dried at about 100° C.

Such a procedure gives a hydrophobic, mechanically stable gas diffusion electrode having a pore diameter of about 3 μm. The surface roughness of the electrode is of the same order of magnitude.

We claim:

1. A porous carbon gas diffusion electrode, comprising a side in contact with a supply of gas and a side in contact with an electrolyte, and a pyrolysis product of a composite of an organic polymer having a spatial globular structure (SGS polymer) and a reinforcing skeleton formed at least in part of organic material, wherein said organic material has substructures for forming hydrogen bonds.

2. The gas diffusion electrode according to claim 1, including a smooth surface and a pore diameter in a range from 0.01 μm to 50 μm.

3. The gas diffusion electrode according to claim 1, including a hydrophobicized surface.

4. The gas diffusion electrode according to claim 1, wherein said substructures are selected from the group consisting of hydroxyl and carboxamide.

5. The gas diffusion electrode according to claim 1, wherein said organic material is selected from the group consisting of cellulose, polyamide, polyester and viscose staple fibers.

6. The gas diffusion electrode according to claim 5, wherein said polyamide organic material is an aromatic polyamide.

7. The gas diffusion electrode according to claim 1, wherein said reinforcing skeleton includes at least 80% by weight of organic material.

8. The gas diffusion electrode according to claim 1, wherein said reinforcing skeleton has a pore radius gradient.

9. The gas diffusion electrode according to claim 8, wherein said pore radius is greater on said side in contact with the gas supply than on said side in contact with the electrolyte.

10. The gas diffusion electrode according to claim 1, wherein said polymer having said spatial globular structure is a phenol/aldehyde condensation polymer.

11. The gas diffusion electrode according to claim 1, wherein said polymer having said spatial globular structure has an H/C ratio of ≦1.5 and an (O+N)/C ratio of ≦0.6.

12. The gas diffusion electrode according to claim 1, wherein said polymer having said spatial globular structure and said reinforcing skeleton have relative proportions in a range of from 20:1 to 1:20 by weight.

13. A process for producing a porous carbon gas diffusion electrode, said porous carbon gas diffusion electrode comprising a side in contact with a supply of gas and a side in contact with an electrolyte, and a pyrolysis product of a composite of an organic polymer having a spatial globular structure (SGS polymer) and a reinforcing skeleton formed at least in part of organic material, wherein said organic material has substructures for forming hydrogen bonds which comprises the steps of providing a composite of an organic polymer having a spatial globular structure (SGS polymer) and a reinforcing skeleton formed at least in part of organic material, and pyrolyzing the composite under protective gas selected from the group consisting of inert gas, reducing gas, and mixtures thereof and which further comprises a step of hydrophobicization of an electrode surface.

14. The process according to claim 13, which further comprises carrying out the pyrolysis step at a temperature in a range of from 600 to 2000° C.

15. The process according to claim 13, which further comprises forming the polymer having the spatial globular structure in the presence of the reinforcing skeleton by condensation polymerization of an acid solution of reactive monomers.

16. The process according to claim 15, wherein the reactive monomers include at least one phenol and at least one aldehyde.

17. The process according to claim 13 wherein the hydrophobicization of the electrode surface is carried out with a perfluorinated polymer.

18. The process according to claim 17, wherein the perfluorinated polymer is a copolymer of tetrafluoroethylene and perfluoro-2,2-dimethyldioxole.

19. The process according to claim 13 wherein the hydrophobicization of the electrode surface is carried out by silylation.

20. The process according to claim 19, which further comprises carrying out the silylation with trimethylchlorosilane.

21. A carbonizable composite affording a porous carbon gas diffusion electrode upon pyrolysis, the composite comprising an organic polymer having a spatial globular structure (SGS polymer) and a reinforcing skeleton formed at least in part of organic material, said SGS polymer and said reinforcing skeleton having comparable volumetric shrinkage upon pyrolysis, wherein said organic material has substructures for forming hydrogen bonds.

22. The composite according to claim 21, wherein said volumetric shrinkage upon pyrolysis of said SGS polymer and said reinforcing skeleton are within plus or minus 10% of one another.

23. The composite according to claim 21, wherein said organic material is selected from the group consisting of cellulose, polyamide, polyester and viscose staple fibers.

24. The composite according to claim 21, wherein said polyamide organic material is an aromatic polyamide.

25. The composite according to claim 21, wherein said reinforcing skeleton includes at least 80% by weight of said organic material.

26. The composite according to claim 21, wherein said reinforcing skeleton has a pore radius gradient.

27. The composite according to claim 26, including an electrode side in contact with a gas supply and an electrode side in contact with an electrolyte, said pore radius being greater on said side in contact with the gas supply than on said side in contact with the electrolyte.

28. The composite according to claim 21, wherein said polymer having a spatial globular structure is a phenol/aldehyde condensation polymer.

29. The composite according to claim 21, wherein said polymer having a spatial globular structure has an H/C ratio of $\leq 1.5$ and an (O+N)/C ratio of $\leq 0.6$.

30. The composite according to claim 21, wherein said polymer having a spatial globular structure and said reinforcing skeleton have relative proportions in a range of from 20:1 to 1:20 by weight.

31. The composite according to claim 21, wherein said substructures are selected from the group consisting of hydroxyl and carboxamide.

* * * * *

UNITED STATES PATENT AND TRADEMARK OFFICE
CERTIFICATE OF CORRECTION

PATENT NO. : 6,361,666 B1 Page 1 of 1
DATED : March 26, 2002
INVENTOR(S) : Matthias Lipinski et al.

It is certified that error appears in the above-identified patent and that said Letters Patent is hereby corrected as shown below:

<u>Title page,</u>
Item [54], Title, -- GAS DIFFUSION ELECTRODE, PROCESS FOR PRODUCING AN ELECTRODE AND CARBONIZABLE COMPOSITE --

Signed and Sealed this

Twenty-fourth Day of September, 2002

*Attest:*

*Attesting Officer*

JAMES E. ROGAN
*Director of the United States Patent and Trademark Office*